United States Patent
Asen et al.

(10) Patent No.: US 9,382,957 B2
(45) Date of Patent: Jul. 5, 2016

(54) DISC BRAKE

(71) Applicant: KNORR-BREMSE Systeme fuer Nutzfahrzeuge GmbH, Munich (DE)

(72) Inventors: Alexander Asen, Eichendorf (DE); Jens Fricke, Vilshofen (DE); Johann Iraschko, Schweitenkirchen (DE); Christian Stoeger, Vilshofen (DE); Michael Peschel, Schoengeising (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/495,070

(22) Filed: Sep. 24, 2014

(65) Prior Publication Data
US 2015/0008078 A1    Jan. 8, 2015

Related U.S. Application Data

(63) Continuation of application No. PCT/EP2013/056023, filed on Mar. 22, 2013.

(30) Foreign Application Priority Data

Mar. 26, 2012   (DE) .......................... 10 2012 006 111

(51) Int. Cl.
*F16D 65/18* (2006.01)
*F16D 65/00* (2006.01)
(Continued)

(52) U.S. Cl.
CPC .......... *F16D 65/0068* (2013.01); *F16D 55/226* (2013.01); *F16D 65/0972* (2013.01);
(Continued)

(58) Field of Classification Search
CPC ................ F16D 2055/0016; F16D 2055/0029; F16D 55/226; F16D 65/0068; F16D 65/0972; F16D 65/095; F16D 65/18; F16D 65/65; F16D 65/54; F16D 65/543; F16D 2127/02
See application file for complete search history.

(56) References Cited

U.S. PATENT DOCUMENTS 3,952,840 A    4/1976   Yamazaki et al.
4,436,186 A *  3/1984   Ritsema ............ F16D 55/22655
                                                188/196 P
(Continued)

FOREIGN PATENT DOCUMENTS

CN    101180475 A    5/2008
DE    2 230 949 A1    1/1973
(Continued)

OTHER PUBLICATIONS

Electronic Translation of FR 2731483 A1.*
(Continued)

*Primary Examiner* — Anna Momper
(74) *Attorney, Agent, or Firm* — Crowell & Moring LLP

(57) ABSTRACT

A disc brake, in particular for a commercial vehicle, has a brake caliper that reaches over a brake disc and is designed as a floating caliper. The brake caliper is fastened to a stationary brake carrier. A brake application device, by which an associated, application-side brake lining can be pressed against the brake disc during braking, is provided, as well as, at least one restoring device having a restoring element, by which restoring device the brake caliper can be brought into an initial position after displacement and release of the brake as a result of braking. The restoring device is designed such that it is retained both in the brake caliper and in the brake carrier on the side of the brake disc opposite the brake application device.

17 Claims, 3 Drawing Sheets

(51) Int. Cl.
*F16D 55/226* (2006.01)
*F16D 65/097* (2006.01)
*F16D 65/58* (2006.01)
*F16D 55/00* (2006.01)
*F16D 121/02* (2012.01)
*F16D 127/02* (2012.01)

(52) U.S. Cl.
CPC ............... *F16D65/18* (2013.01); *F16D 65/58* (2013.01); *F16D 2055/0016* (2013.01); *F16D 2055/0029* (2013.01); *F16D 2121/02* (2013.01); *F16D 2127/02* (2013.01)

(56) References Cited

U.S. PATENT DOCUMENTS

| | | | | |
|---|---|---|---|---|
| 4,807,725 | A | * | 2/1989 | Weiler ............... F16D 55/22655 188/196 P |
| 4,865,161 | A | * | 9/1989 | Schneider ......... F16D 55/22655 188/196 P |
| 6,161,658 | A | * | 12/2000 | Becocci .................... B62L 1/00 188/196 M |
| 2008/0128222 | A1 | | 6/2008 | Birkeneder |
| 2010/0000828 | A1 | | 1/2010 | Pericevic et al. |

FOREIGN PATENT DOCUMENTS

| | | | | |
|---|---|---|---|---|
| DE | 3029472 | A1 | * 3/1982 | ........ F16D 55/22655 |
| DE | 34 03 297 | A1 | 8/1985 | |
| DE | 87 11 776 | U1 | 3/1988 | |
| DE | 41 19 928 | A1 | 12/1992 | |
| DE | 197 45 775 | A1 | 5/1999 | |
| DE | 10 2007 001 213 | A1 | 7/2008 | |
| FR | 2731483 | A1 | * 9/1996 | ........ F16D 55/22655 |
| GB | 1 293 679 | A | 10/1972 | |
| GB | 1 373 817 | A | 11/1974 | |
| GB | 2 097 876 | A | 11/1982 | |
| JP | 8-232995 | A | 9/1996 | |
| JP | 2005-48934 | A | 2/2005 | |
| WO | WO 01/36838 | A1 | 5/2001 | |

OTHER PUBLICATIONS

International Search Report dated Jul. 3, 2013 with English translation (eight (8) pages).
German Office Action dated Dec. 10, 2012 (eight (8) pages).
International Preliminary Report on Patentability (PCT/IB/373), including Written Opinion (PCT/ISA/237) dated Oct. 1, 2014 with English translation (10 pages).
Chinese Office Action issued in counterpart Chinese Application No. 201380022499.X dated Feb. 2, 2016 with English translation (nine pages).

* cited by examiner

DISC BRAKE

CROSS REFERENCE TO RELATED APPLICATIONS

This application is a continuation of PCT International Application No. PCT/EP2013/056023, filed Mar. 22, 2013, which claims priority under 35 U.S.C. §119 from German Patent Application No. 10 2012 006 111.0, filed Mar. 26, 2012, the entire disclosures of which are herein expressly incorporated by reference.

BACKGROUND AND SUMMARY OF THE INVENTION

The invention relates to a disc brake, in particular for a commercial vehicle, having a brake caliper that straddles a brake disc and is designed as a sliding caliper, the brake caliper being secured on a fixed brake carrier, a brake application device, by which an associated, application-side brake pad can be pressed against the brake disc during braking, and at least one restoring device having a return element, by which the brake caliper can be brought into an initial position after movement due to braking and release of the brake.

When the brake application device of a sliding caliper disc brake of this kind is actuated, the action-side, i.e. the application-side, brake pad is first of all pressed against the brake disc and, as the operation progresses, the reaction forces which arise press the brake caliper against the other side of the brake disc, taking the opposite, reaction-side brake pad along in the process.

In order to move the brake caliper into an initial position after release of the application force and thus to prevent the brake pads from resting in sliding contact with the brake disc, even if free from braking forces, which leads to the brake running hot and to excessive abrasion of the friction facing of the brake pads, the use of a restoring device is proposed in DE 10 2007 001 213 A1, for example.

In the case of the disc brake known therefrom, a restoring device is provided on the application side in one of the guide bars by means of which the brake caliper is held movably on the brake carrier. The restoring device has an elastically deformable return element, specifically a compression spring, by which the brake caliper is moved automatically into an initial position.

To perform these, so to speak, multifunctional tasks, the guide bar or the sliding bearing formed must be modified accordingly, requiring special production measures. This also takes account of the aspect that one of the two bearings with which the respective guide bar is associated is designed as a floating bearing and the other bearing is designed as a fixed bearing.

DE 22 30 949 A1 discloses a disc brake in which the return element is formed from a leaf spring, by means of which the brake pad is likewise pulled out of the region of contact with the brake disc in the unloaded position.

However, there is a very pronounced change in the characteristic of this leaf spring due to the extent of wear of the brake pad, with the result that uniform retraction of the brake pad or a uniform retraction distance is not guaranteed.

It is the underlying object of the invention to develop a disc brake of the type in question in such a way that it is of simpler structural design and that its service life, in particular that of the brake pads and of the brake disc, is increased.

This and other objects are achieved by a disc brake, in particular for a commercial vehicle, having a brake caliper that straddles a brake disc and is designed as a sliding caliper, the brake caliper being secured on a fixed brake carrier, a brake application device, by which an associated, application-side brake pad can be pressed against the brake disc during braking, and at least one restoring device having a return element, by which the brake caliper can be brought into an initial position after movement due to braking and release of the brake. The restoring device is held both in the brake caliper and in the brake carrier on the opposite side of the brake disc from the brake application device.

By arranging the restoring device on the opposite side from the brake application device, the side facing the reaction-side brake pad, effective, in particular automatic, return of the brake caliper is achieved at the same time as minimum interference with the rigidity of the system.

Thus, support for the restoring device in the brake caliper and in the brake carrier is possible in a region situated outside high bending stresses during braking. If appropriate, a locating lug for supporting the restoring device can be formed integrally during the production of the brake caliper, which is usually composed of cast iron.

Two restoring devices are preferably provided, more specifically outside the region of overlap of the brake pad. The forces which arise are thus absorbed uniformly.

To compensate for a change in the release clearance, i.e. the spacing between the brake pads and the brake disc, due to deformation of functional parts such as the brake caliper, the brake application mechanism or the like, and to abrasion of the brake pads caused by braking, an adjustment device is integrated into the restoring device, ensuring that said changes in the functional parts have no effect on the functional behavior of the disc brake overall.

A preferred variant embodiment of the invention provides a bolt firmly connected to the brake carrier.

A sleeve is positioned in a fixed manner in the brake caliper and is held, in turn, in a hood-type cover pressed into the brake caliper, wherein a return element and the adjustment device are positioned in the sleeve.

The return element consists of a compression spring, especially a spring assembly consisting of diaphragm springs, which is supported, on the one hand, on the sleeve, which thus forms an abutment, and, on the other hand, on a clamping ring, which forms the adjustment device.

The sleeve has two stops arranged with a spacing relative to one another in the direction of movement of the brake caliper, between which the clamping ring is arranged, wherein the thickness of the clamping ring, which surrounds the bolt with a clamping action, is less by the predetermined release clearance than the spacing between the two stops. During a braking operation, in which, as described, the brake caliper is moved, taking the reaction-side brake pad along in the direction of the brake application device, as the reaction forces take effect, the compression spring is simultaneously stressed, i.e. compressed, and the gap defining the release clearance between one stop and the clamping ring is closed.

After release of the brake, the compression spring expands and pushes the sleeve and hence the brake caliper into an initial position, in which the second stop rests against the clamping ring and the gap between the clamping ring and the first stop is reestablished.

Wear adjustment is performed with the aid of the clamping ring, with the compression spring being largely compressed during the reaction-induced movement of the brake caliper. If, owing to wear, the associated brake pad is not yet resting on the brake disc, the brake caliper is moved further, overcoming the friction forces acting on the bolt by virtue of the clamping ring, with a movement of the clamping ring and hence of the brake caliper relative to the bolt in the direction of the brake disc taking place and the spacing between the brake caliper and the brake disc decreasing.

After release of the brake, the brake caliper, which has been moved relative to the bolt by the amount of wear or component deformation, is pushed back into its end position, this travel being determined as before by the spring travel of the compression spring, which corresponds to the desired release clearance.

The holding force of the clamping ring is produced by radial stress, for which purpose the clamping ring, which is otherwise held with a radial undersize in the sleeve, has a through slot. Before assembly, i.e. before the clamping ring is placed on the bolt, the inside diameter of the clamping ring is less than the outside diameter of the bolt. After the clamping ring has been fitted, the internal restoring forces produce the required preloading force, i.e. clamping force.

The sleeve is preferably designed as a deep-drawn part, wherein the stops for limiting the movement of the brake caliper are produced to correspond with the clamping ring by denting the sleeve.

To install the clamping ring, a stop is first of all produced by pressing in the sleeve, after which the clamping ring is inserted and then the second stop is formed, likewise by pressing in the circumferential surface.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
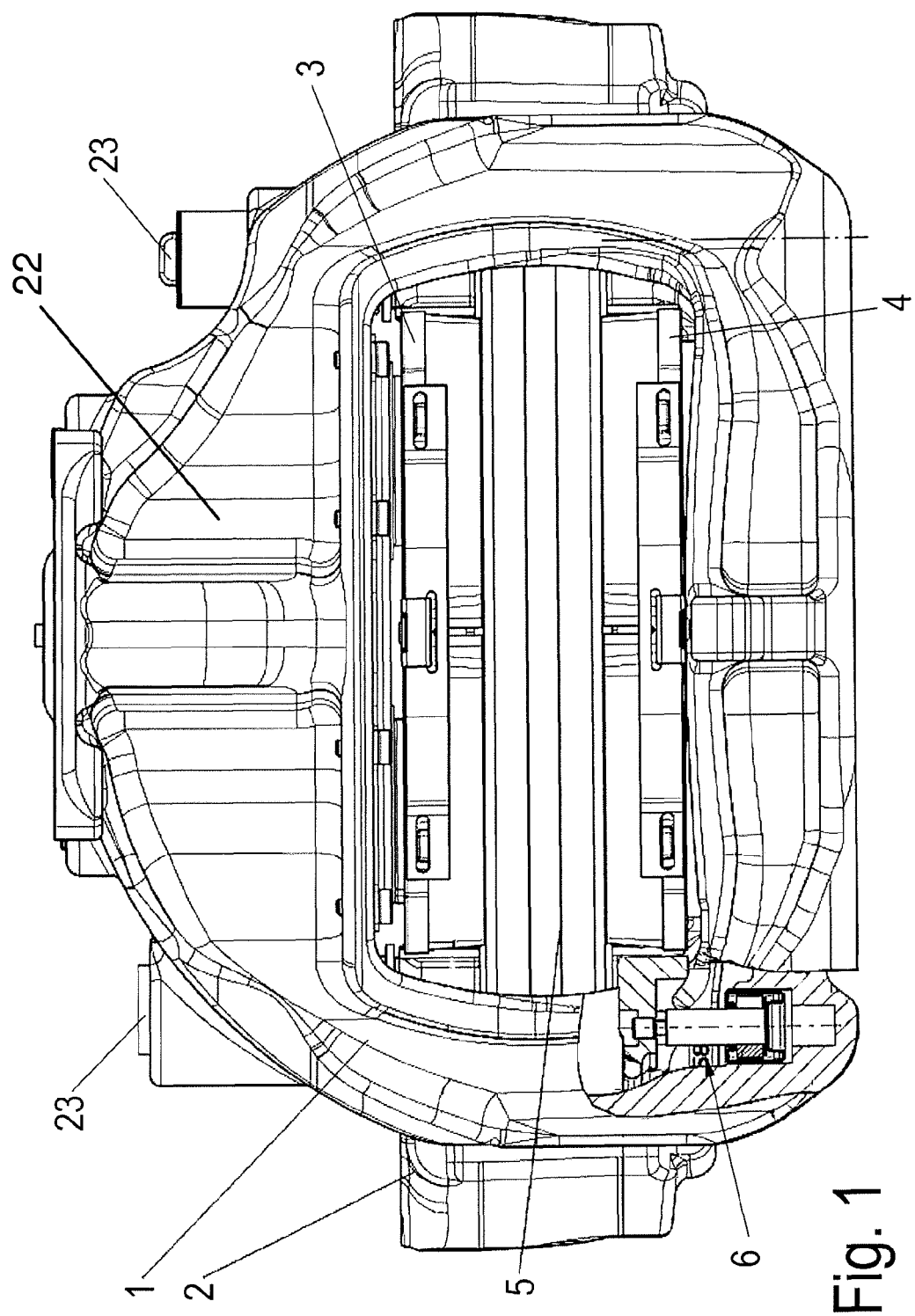
FIG. 1 shows a disc brake according to an embodiment of the invention in a partially sectioned plan view.

In FIG. 1, a disc brake, in particular a disc brake for a commercial vehicle, is shown, having a brake caliper 1 that straddles over a brake disc 5 and is designed as a sliding caliper. The brake caliper is secured on a fixed brake carrier 2. A brake application device, by means of which an associated, action-side brake pad 3 can be pressed against the brake disc 5 during a braking operation, is arranged in the brake caliper 1 in an area represented by arrow 22.

When contact is made with brake pad 3 on the brake disc 5, the reaction forces which arise move the brake caliper 1 in the direction of the brake application device 22 while taking along a reaction-side brake pad 4, for which purpose the brake caliper 1 is mounted movably on guide bars 23. The guide bars 23 are connected to the brake carrier 2.

At least one restoring device 6 is held in the brake caliper 1 and in the brake carrier 2 on the opposite side of the brake disc 5 from the brake application device 22. The restoring device is shown in detail in FIGS. 2 and 3. Two restoring devices 6 are each preferably arranged approximately in the region of the guide bars 23.

The restoring device 6 has a bolt 9, to one end of which a threaded pin 10 screwed into the brake carrier 2 is connected.

A seal 15 is embodied in such a way that radial movements of the bolt 9 or radial tolerances can be compensated.

Figure 5:
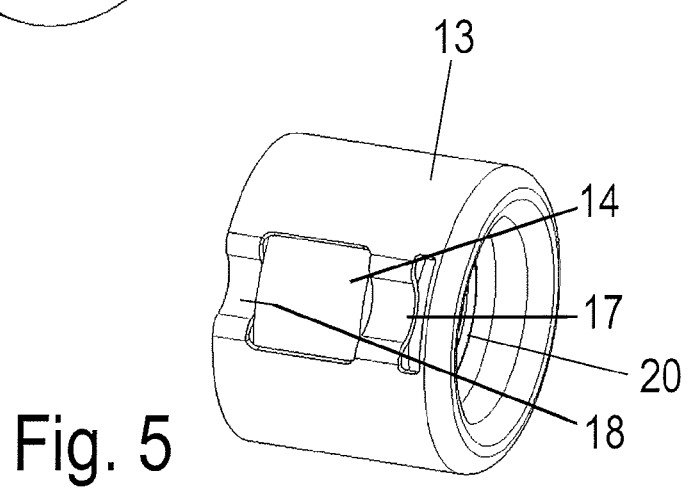

Arranged in a cover 12 is a sleeve 13, which is shown in detail in FIG. 5. The sleeve 13 has two stops 17, 18 extending at a distance from one another. The stops are formed by forming in the radial direction. Between the stops 17, 18, there is arranged a clamping ring 14, which is held on the bolt 9. The overall height of the clamping ring 14 is less than the spacing between the two stops 17, 18. As a result, a gap dimension A is formed, corresponding to a release clearance, i.e. to the spacing between brake pad 4 and the brake disc 5 in the unbraked position.

Arranged between the clamping ring 14 and a drawn-in bottom 20 of the sleeve 13 is a compression spring 8 which, in the present example, consists of two diaphragm springs resting against one another, the concave sides of which face one another. One diaphragm spring is supported on the clamping ring 14 and the other on the bottom 20 of the sleeve 13.

Figure 2:
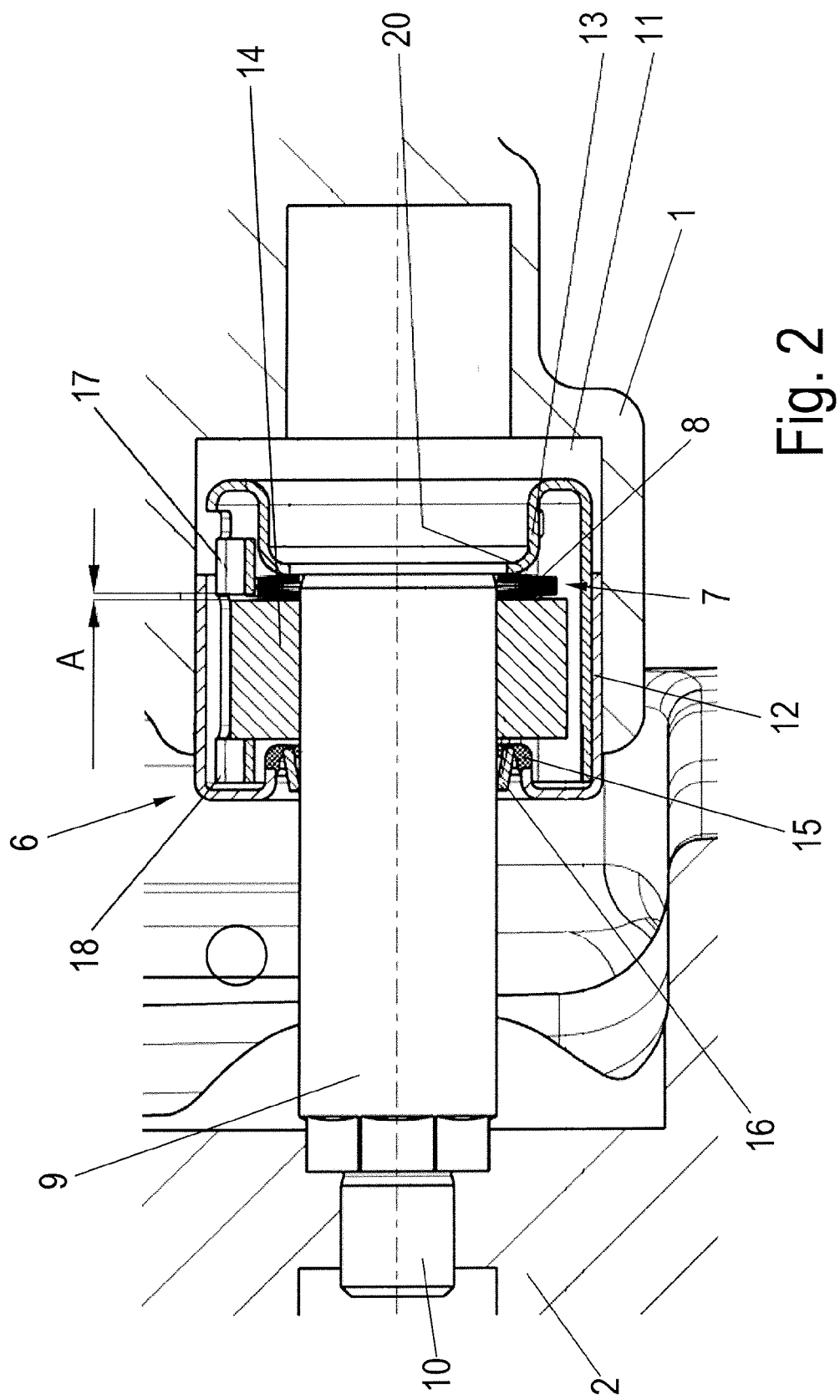
FIG. 2 shows a partial section through the disc brake along the line II-II in FIG. 1.

In FIG. 2, an unbraked situation is shown, i.e. the disc brake is in a nonfunctioning position.

In the case of a braking operation, the brake caliper 1 is moved in the direction of the brake disc 5 by the reaction forces which arise, this being equivalent to movement in the direction of the brake carrier 2, taking along the cover 12 and the sleeve 13 connected firmly thereto.

During movement of the brake caliper 1, the compression spring 8 is compressed by the bottom 20 of the sleeve 13, with the clamping ring 14, which is held by frictional engagement on the bolt 9, forming an abutment for the compression spring 8. Here, the clamping force with which the clamping ring 14 rests on the bolt 9 is greater than the spring force of the compression spring 8.

During this process, the gap A representing the release clearance is reduced until stop 17 rests on the clamping ring 14, wherein the spring travel of the compression spring 8 must be greater than the gap dimension A.

The clamping ring 14 forms an adjustment device for compensating a change in the release clearance. If the release clearance enlarged due to wear and the deformation of the caliper back and of the pads is present, the brake caliper 1 is moved beyond the gap dimension A until the reaction-side brake pad 4 rests against the brake disc 5.

During this process, the clamping ring 14 is moved by stop 17 into a modified initial position, overcoming the clamping force acting on the bolt 9.

When the brake is released, the compression spring 8 expands and pushes the brake caliper 1 into a nonfunctioning position, with the sleeve 13, which is fixed relative to the brake caliper 1, being moved relative to the clamping ring 14 until the stop 18 on the left-hand side in FIG. 2 comes to rest against the clamping ring 14 and the gap A is established.

Figure 3:
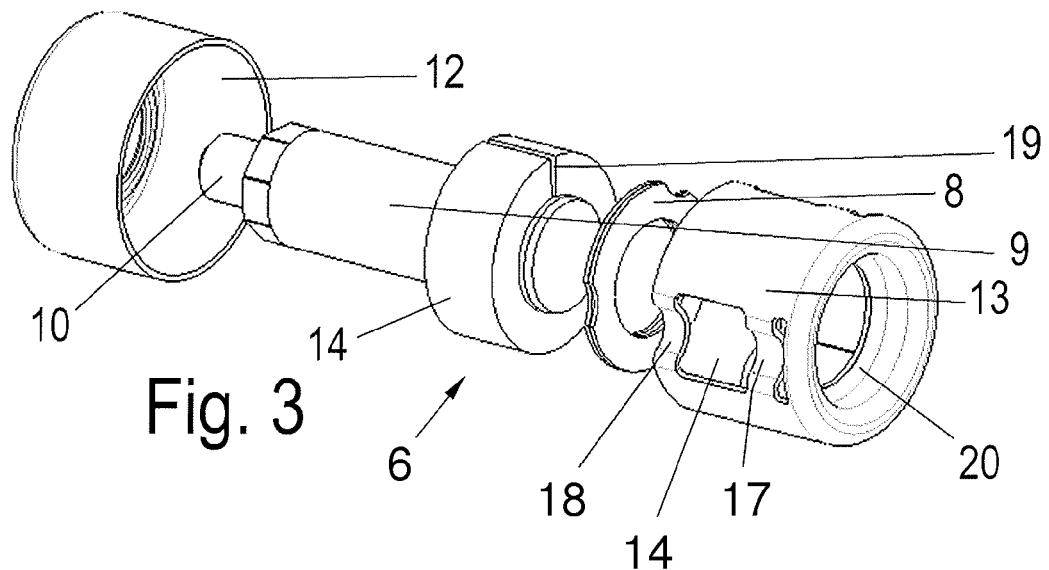
FIG. 3 shows a return element of the disc brake in an exploded view.
Figure 4:
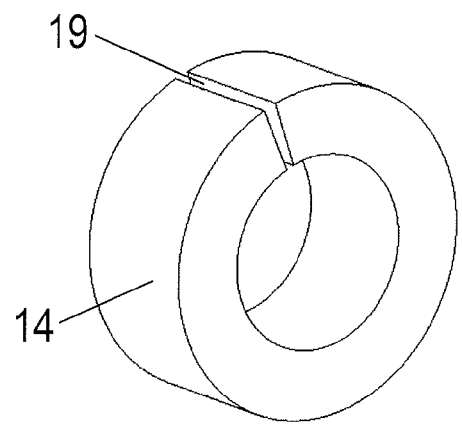
FIGS. 4 and 5 each show a detail of the restoring device in a perspective view.

In FIG. 3, the restoring device 6 is shown in an exploded view. In this, it can be seen that the sleeve 13 has a punched-out aperture to form the stops 17, 18, the two axially opposite edges of said aperture forming the stops 17, 18 by being formed in a radial direction.

In FIG. 5, the sleeve 13 can be seen with the clamping ring 14 inserted, the outside diameter of the clamping ring being smaller than the clear diameter of the sleeve 13 in order to compensate for tolerances.

To produce the clamping force with which the clamping ring 14 is held on the bolt 9, a through slot 19 is introduced into the clamping ring 14 and the clear diameter of the clamping ring 14 is smaller than the outside diameter of the bolt 9. Once the clamping ring 14 has been pushed onto the bolt 9, the clamping ring 14 is firmly clamped to the bolt 9 by virtue of the effective restoring forces.

LIST OF REFERENCE SIGNS 1 brake caliper
2 brake carrier 3 brake pad
4 brake pad
5 brake disc
6 restoring device
7 return element
8 compression spring
9 bolt
10 threaded pin
11 recess
12 cover
13 sleeve
14 clamping ring
15 seal
16 scraper
17 first stop
18 second stop
19 slot
20 annular bottom
21 aperture
22 brake application device
23 guide bar The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake, comprising:
a caliper which, in use, straddles a brake disc and is configured as a sliding caliper;
a fixed brake carrier on which the sliding caliper is mounted;
a brake application device arranged in the caliper, by which brake application device an associated application-side brake pad is pressable against the brake disc during braking; and
at least one restoring device comprising a return element, wherein
the restoring device is held both in the brake caliper and in the brake carrier in parts thereof that are on an opposite side of the brake disc from the brake application device, the restoring device being separate and spaced from guide bars on which the caliper slides relative to the brake carrier, and being configured to return the caliper into an initial position after sliding due to the braking and release of the braking.

2. The disc brake according to claim 1, wherein the disc brake is a commercial vehicle disc brake.

3. The disc brake according to claim 1, further comprising: an adjusting device integrated into the restoring device.

4. The disc brake according to claim 1, wherein the return element of the restoring device comprises a compression spring.

5. The disc brake according to claim 4, wherein the compression spring is formed of at least one diaphragm spring.

6. The disc brake according to claim 4, wherein the restoring device further comprises a bolt connected to the brake carrier.

7. A disc brake, comprising:
a caliper which, in use, straddles a brake disc and is configured as a sliding caliper;
a fixed brake carrier on which the sliding caliper is mounted;
a brake application device arranged in the caliper, by which brake application device an associated application-side brake pad is pressable against the brake disc during braking; and
at least one restoring device comprising a return element, wherein
the restoring device is held both in the brake caliper and in the brake carrier on an opposite side of the brake disc from the brake application device, the restoring device being configured to return the caliper into an initial position after sliding due to the braking and release of the braking,
the restoring device comprising:
a compression spring configured as the return element,
a bolt connected to the brake carrier,
pot-shaped cover secured in a recess of the brake caliper, and
a sleeve firmly connected to the pot-shaped cover to form an inner chamber in the pot-shaped cover.

8. The disc brake according to claim 7, wherein the restoring device further comprises:
a clamping ring held non positively on the bolt, the clamping ring being positioned in the sleeve, wherein
the clamping ring forms an abutment for the compression spring, which compression spring is supported on another side on a bottom of the sleeve.

9. The disc brake according to claim 8, wherein:
the sleeve has two stops arranged with a spacing relative to one another, the two stops providing an axial stop for the clamping ring,
an overall height of the clamping ring is less than the spacing of the two stops, wherein a differential dimension therein formed corresponds to a predetermined release clearance of the disc brake.

10. The disc brake according to claim 9, wherein an axial clamping force of the clamping ring, by which the clamping ring is held on the bolt, is greater than a spring force of the compression spring.

11. The disc brake according to claim 10, wherein the pet-pot-shaped cover has a concertric sealing ring, and
adjoining the concentric sealing ring, a scraper rests on the bolt.

12. The disc brake according to claim 11, wherein a spring travel of the compression spring is greater than a size of the predetermined release clearance.

13. The disc brake according to claim 12, wherein an outer diameter of the clamping ring is less than a clear diameter of the sleeve.

14. A restoring device for returning a sliding caliper of a disc brake to an initial position after movement due to braking, the restoring device comprising:
a bolt configured to be connectable to a brake carrier of the disc brake;
a pot-shaped cover configured to be secured in a recess of the sliding caliper;
a sleeve firmly connected to an interior of the pot-shaped cover in order to form an inner chamber, the bolt extending into the inner chamber;
a clamping ring held non positively on the bolt, the clamping ring being positioned in the sleeve;
a compression spring that forms an abutment for the clamping ring on one side thereof and is supported on the other side thereof on a bottom portion of the sleeve, wherein
the sleeve has two stops arranged with a spacing relative to one another to provide an axial stop for the clamping ring, an overall height of the clamping ring being less than a spacing of the stops and a differential dimension between the overall height of the clamping ring and the spacing of the stops being configured to correspond to a predetermined release clearance of the disc brake.

15. The restoring device according to claim 14, wherein the clamping ring is provided with an axial clamping force for holding the clamping ring non positively on the bolt, the axial clamping force being designed to be greater than a spring force of the compression spring by which the caliper is returned to the initial position after movement due to braking.

16. The restoring device according to claim 15, wherein the cover comprises a concentric sealing ring and, adjoining the concentric sealing ring, a scraper, wherein the scraper rests against the bolt.

17. The restoring device according to claim 16, wherein a spring travel of the compression spring is greater than a size of the predetermined release clearance.

\* \* \* \* \*